(12) United States Patent
Moneyhun et al.

(10) Patent No.: US 12,607,099 B2
(45) Date of Patent: Apr. 21, 2026

(54) FUGITIVE GAS REMEDIATION SYSTEM

(71) Applicant: Moneyhun Equipment Sales & Service Co., Inc., Rock Springs, WY (US)

(72) Inventors: David Moneyhun, Rock Springs, WY (US); Bernie Claydon, Kelowna (CA)

(73) Assignee: Moneyhun Equipment Sales & Service Co., Inc., Rock Springs, WY (US)

( * ) Notice: Subject to any disclaimer, the term of this patent is extended or adjusted under 35 U.S.C. 154(b) by 49 days.

(21) Appl. No.: 18/821,240

(22) Filed: Aug. 30, 2024

(65) Prior Publication Data

US 2024/0426194 A1      Dec. 26, 2024

Related U.S. Application Data

(63) Continuation of application No. 17/204,026, filed on Mar. 17, 2021, now Pat. No. 12,110,769.

(60) Provisional application No. 62/991,187, filed on Mar. 18, 2020.

(51) Int. Cl.

| | |
|---|---|
| *E21B 41/00* | (2006.01) |
| *B01D 53/86* | (2006.01) |
| *B01D 53/88* | (2006.01) |
| *E21B 36/00* | (2006.01) |
| *E21B 43/34* | (2006.01) |

(52) U.S. Cl.
CPC .......... *E21B 41/005* (2013.01); *B01D 53/864* (2013.01); *B01D 53/885* (2013.01); *E21B 36/00* (2013.01); *E21B 43/34* (2013.01); *B01D 2257/702* (2013.01)

(58) Field of Classification Search
None
See application file for complete search history.

(56) References Cited

U.S. PATENT DOCUMENTS

| | | | |
|---|---|---|---|
| 2,245,028 | A | 6/1941 | Floyd |
| 4,779,677 | A | 10/1988 | Cobb |
| 6,955,704 | B1 | 10/2005 | Strahan |
| 7,484,385 | B2 | 2/2009 | Patel et al. |
| 10,017,701 | B2 | 7/2018 | Meyer |
| 10,150,081 | B2 | 12/2018 | Nurkowski et al. |

(Continued)

FOREIGN PATENT DOCUMENTS

| | | |
|---|---|---|
| CA | 2325966 | 5/2002 |

OTHER PUBLICATIONS

NGL Pro Flare Reduction, NGL Recovery and Gas Conditioning, Aspen Engineering Services, LLC, 23 pgs. (published Mar. 21, 2018).

(Continued)

*Primary Examiner* — Jelitza M Perez
(74) *Attorney, Agent, or Firm* — Thorpe North & Western, LLP

(57) ABSTRACT

A fugitive gas remediation (FGR) system for eliminating fugitive gas, such as surface casing vent gas produced from the casing head of an oil well, or so-called casinghead or Bradenhead gas, and other fugitive gas sources. An enclosure is positioned at a site with a fugitive gas source, such as a wellhead. A separator is located in the enclosure to remove liquid from the fugitive gas. A catalytic heater is located in the enclosure and coupled to the separator to react with the fugitive gas and produce heat in the enclosure. A pilot gas source can provide pilot gas to the catalytic heater.

17 Claims, 8 Drawing Sheets

(56)          References Cited

U.S. PATENT DOCUMENTS

| | | | |
|---|---|---|---|
| 10,322,397 | B2 | 6/2019 | Visser et al. |
| 10,561,977 | B2 | 2/2020 | Johannessen et al. |
| 10,684,154 | B2 | 6/2020 | Layher et al. |
| 11,319,217 | B2 | 5/2022 | DiBenerdini et al. |
| 2007/0227186 | A1 | 10/2007 | Alferov et al. |
| 2009/0031756 | A1 | 2/2009 | Betting et al. |
| 2014/0174122 | A1 | 6/2014 | Cooper et al. |
| 2017/0120191 | A1 | 5/2017 | Nurkowski et al. |
| 2018/0127336 | A1 | 5/2018 | Maldonado et al. |
| 2021/0002989 | A1 | 1/2021 | Moneyhun et al. |
| 2021/0317378 | A1 | 10/2021 | Moneyhun et al. |
| 2022/0134283 | A1 | 5/2022 | Maldonado |
| 2022/0228079 | A1 | 7/2022 | Meyer |
| 2022/0228803 | A1 | 7/2022 | Meyer |

OTHER PUBLICATIONS

CCSC Technology—Trailer Mounted Well Testing System, 2017, http://www.cosctech.com/all-products-services/Trailer-mounted-well-testing-system?btwaf=27544517, retrieved Jul. 18, 2024, 2 pages.

FUGITIVE GAS REMEDIATION SYSTEM

PRIORITY CLAIM(S)

This is a continuation of U.S. patent application Ser. No. 17/204,026, filed Mar. 17, 2021; which claims priority to U.S. Provisional Patent Application Ser. No. 62/991,187, filed Mar. 18, 2020; which are hereby incorporated herein by reference.

BACKGROUND

The present invention relates generally to a fugitive gas remediation system for eliminating surface casing vent gas produced from the casing head of an oil well, or so-called casinghead or Bradenhead gas, and other fugitive gas sources.

In oil and gas wells, low-pressure and low-volume surface casing vent gas (fugitive gas emissions) can leak up between the casing and the cement of the well. In the past, this gas has been blown back down the well, escaped to the atmosphere, or been flared-off. Some states have increased regulatory requirements for, and many companies have specified, a safe, clean and efficient means of managing Bradenhead pressures and the ensuing fugitive gas emissions. Some states mandate that the gas pressure cannot exceed 50 psi to resist contaminating ground water.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
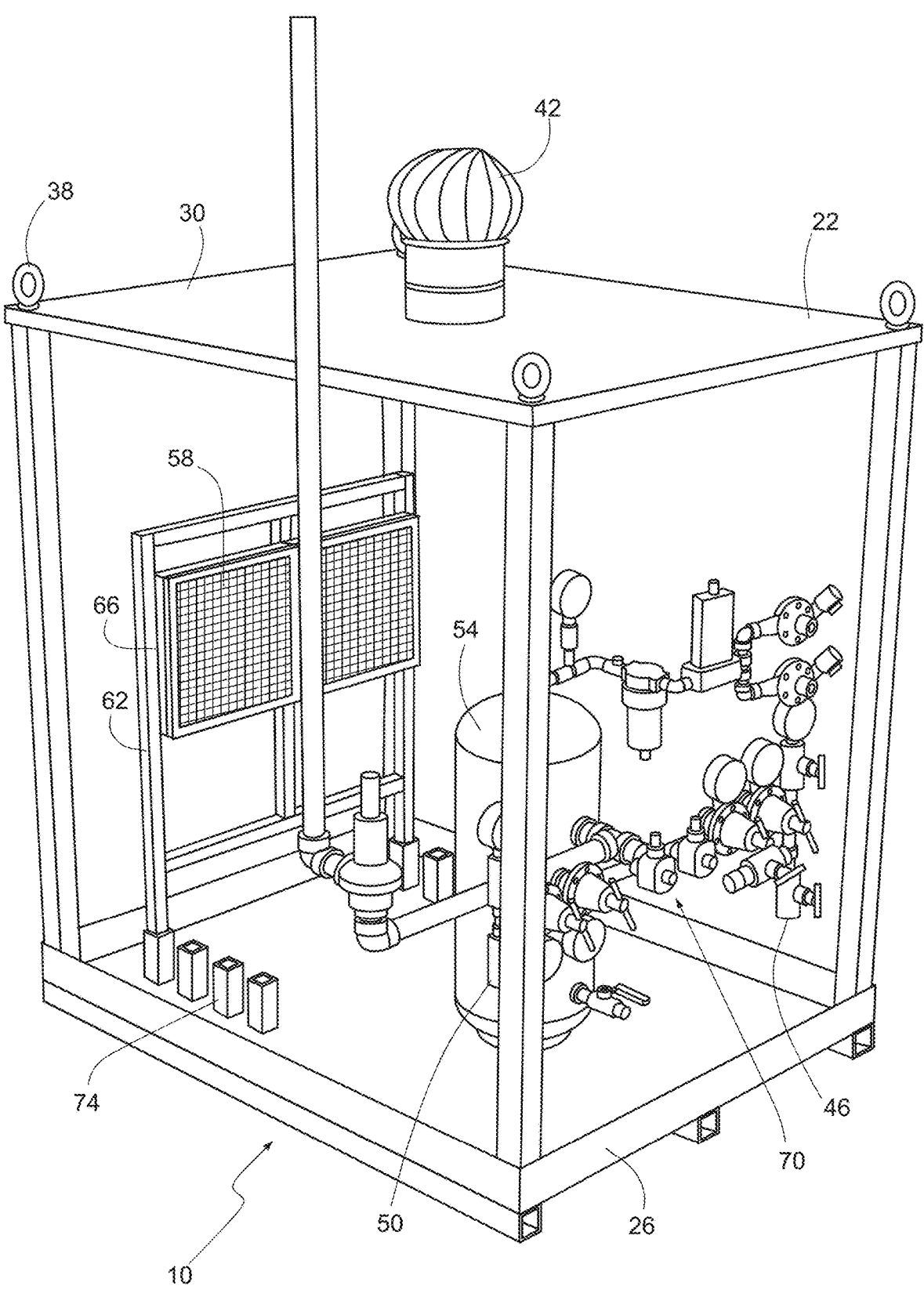
FIG. 1 is a perspective view of a fugitive gas remediation (FGR) system in accordance with one embodiment, shown with walls of a skid removed for visibility.
Figure 2:
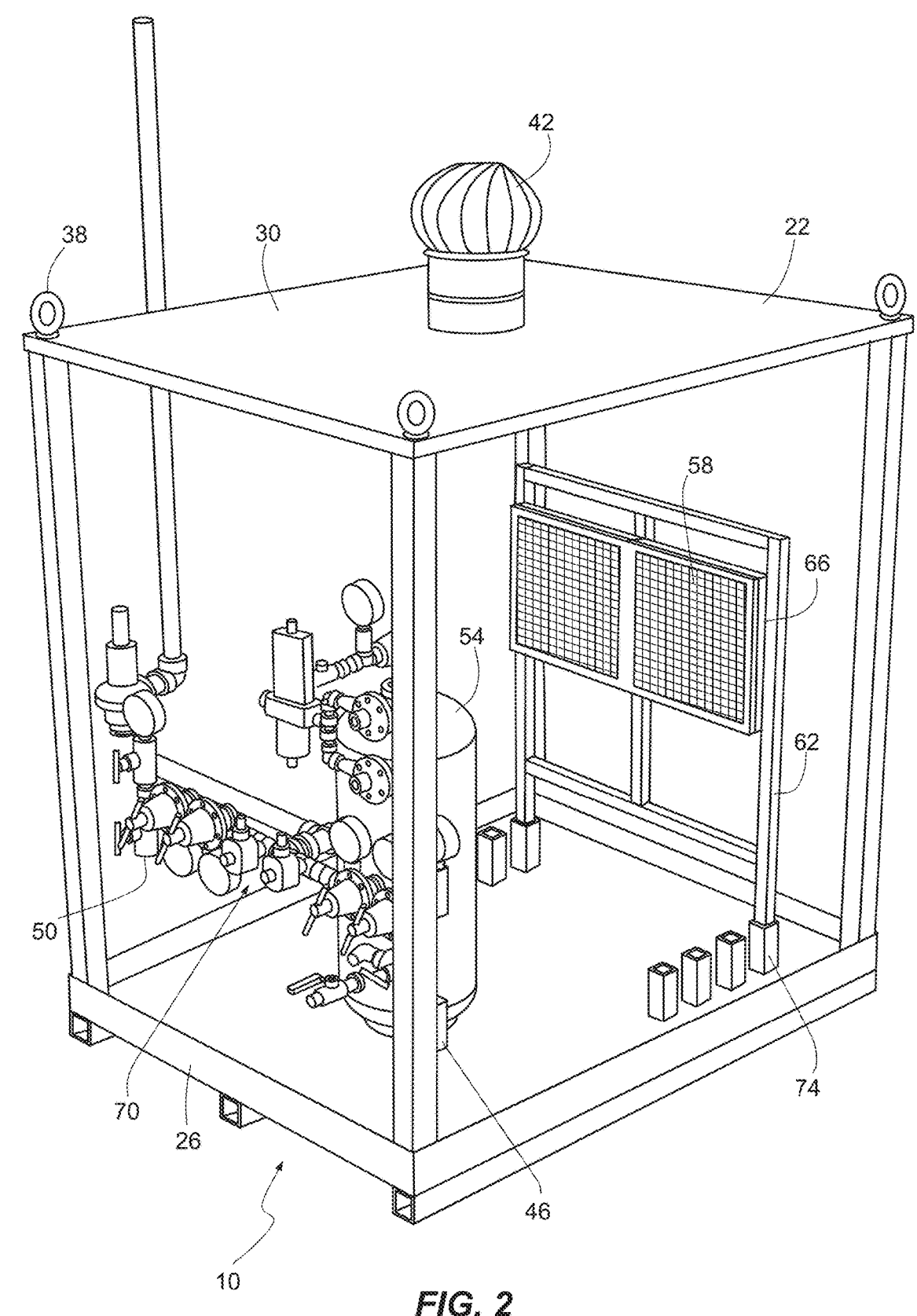
FIG. 2 is a perspective view of the FGR system of FIG. 1, again shown with the walls of the skid removed for visibility.
Figure 3:
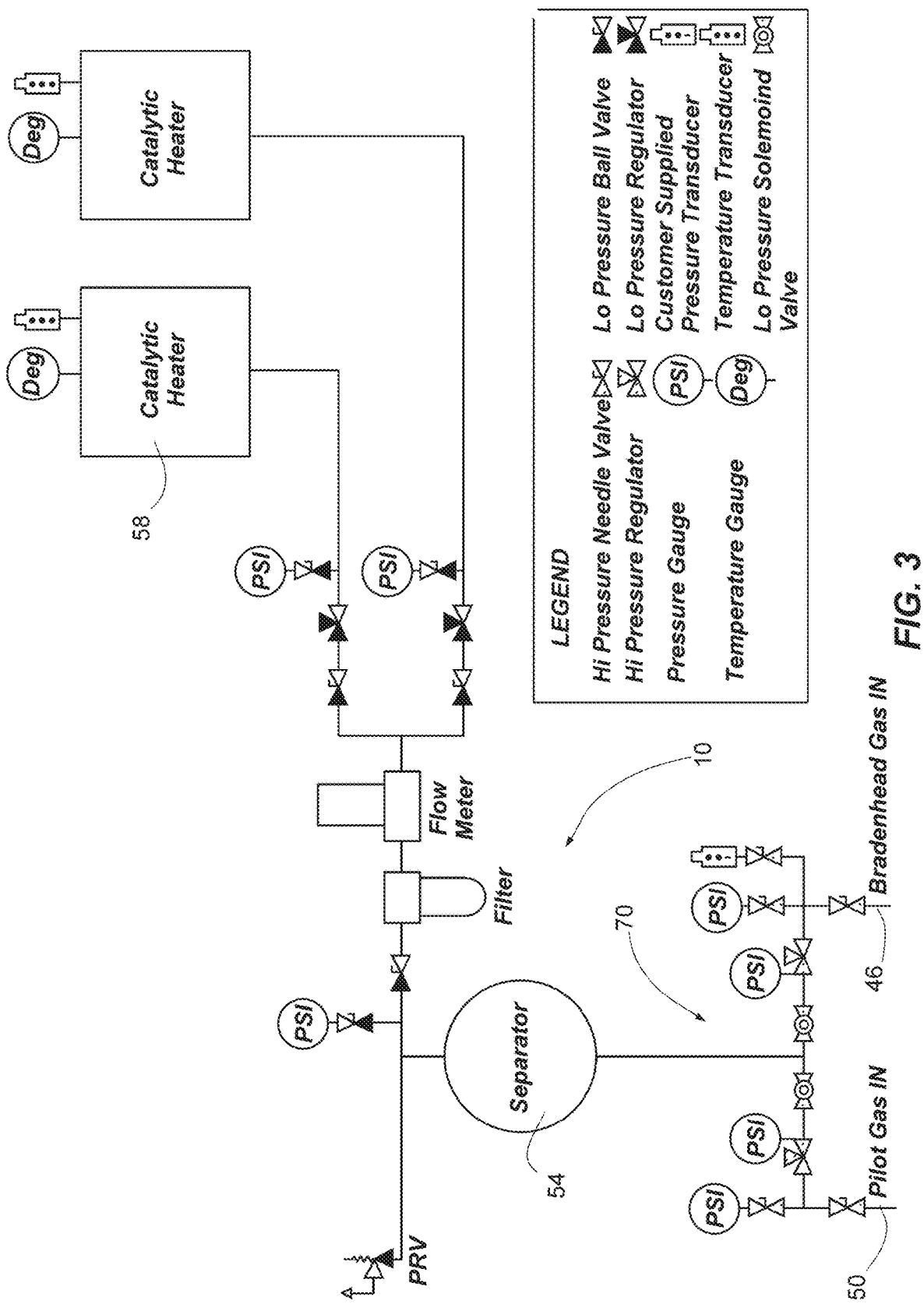
FIG. 3 is a schematic pipe diagram of the FGR system of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

It has been recognized that it would be advantageous to develop a system and method for eliminating or destroying methane emissions to the atmosphere while maintaining Bradenhead pressure within company required and state mandated limits. A fugitive gas remediation (FGR) system and method is presented for combining pressure management and fugitive gas destruction which eliminates undesirable methane emissions to the atmosphere, while maintaining Bradenhead pressure within specified limits. The FGR system can eliminating casing vent gas from a wellhead, and/or other undesirable low-pressure and low-volume gas that escapes a system. The FGR system can destroy the vent gas in real time without flaring. The Bradenhead gas is reacted in a catalytic heater. In one aspect, no gases are vented to atmosphere. In another aspect, a pilot gas system can be employed to ensure constant operation in the event the Bradenhead gas pressure/flow falls too low to sustain a catalytic reaction. The FGR system can automatically shift from pilot gas to Bradenhead gas. In another aspect, a booster unit can be used in unison with a primary unit to provide additional capacity if the Bradenhead gas flow exceeds the capacity of the primary unit. The systems can be pressure rated at or above the wellhead pressure to contain, rather than release, pressure and gas flow. In one aspect, the FGR system can be used adjacent a wellhead to eliminate casing vent gas. In another aspect, the FGR system can be used adjacent storage tanks. In another aspect, the FGR system can be used with instrumentation gas.

Referring to FIGS. 1-7, a FGR system 10 in accordance with one embodiment is shown for eliminating fugitive gas, such as casing vent gas, or Bradenhead gas, from a wellhead or any location requiring fugitive gas remediation. The FGR system 10 can comprise an enclosure 18 (FIGS. 4 and 7) to be positioned at a site with a fugitive gas source, such as a well site adjacent the wellhead. In one aspect, the enclosure 18 can be substantially enclosed so as to form a majority enclosure. In another aspect, the enclosure 18 can form a super-majority enclosure. The enclosure 18 can have openings therein for piping, venting, and air intake.

Figure 4:
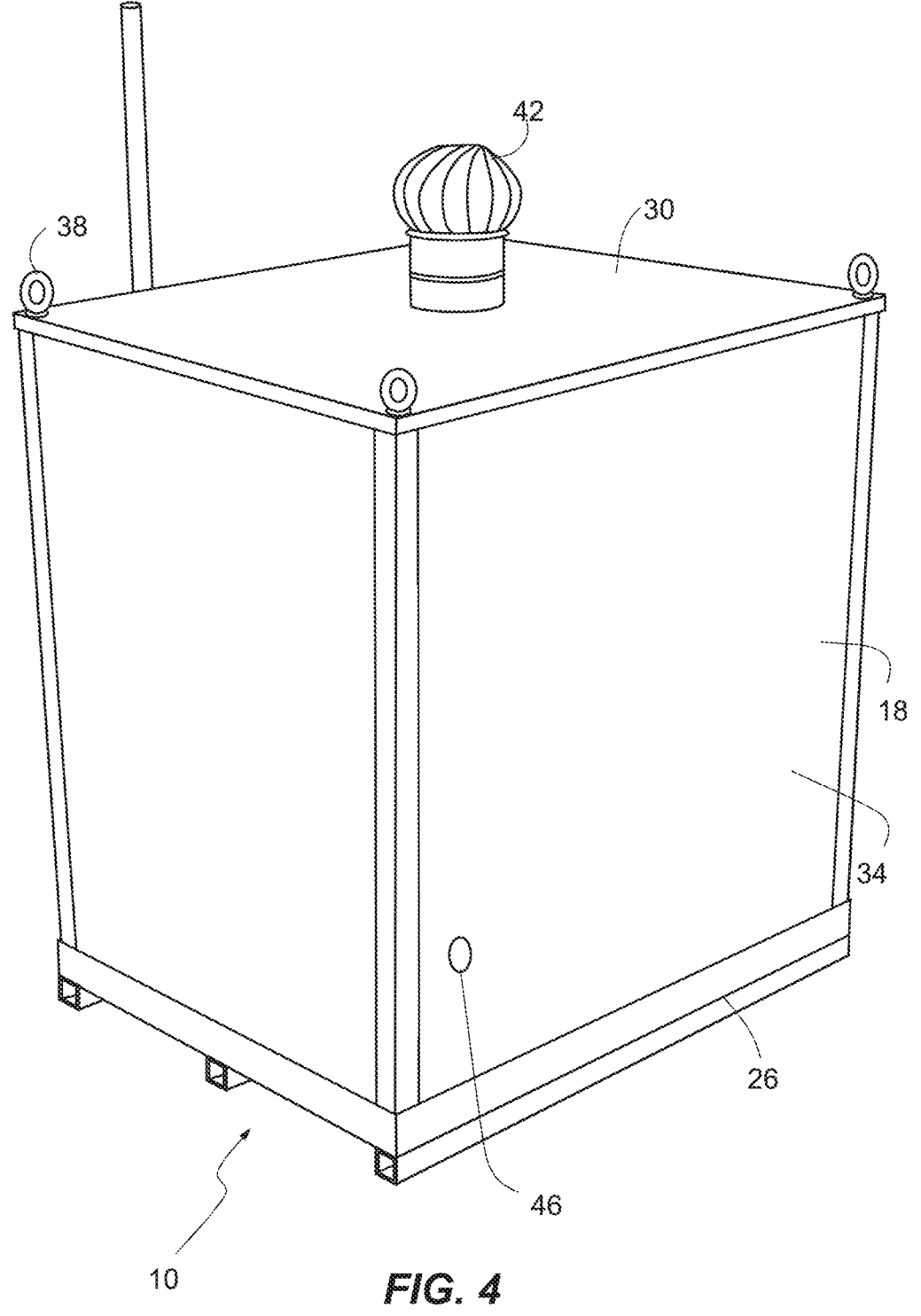
FIG. 4 is a perspective view of the FGR system of FIG. 1, shown with the wall on the skid forming an enclosure.
Figures 5, 6:
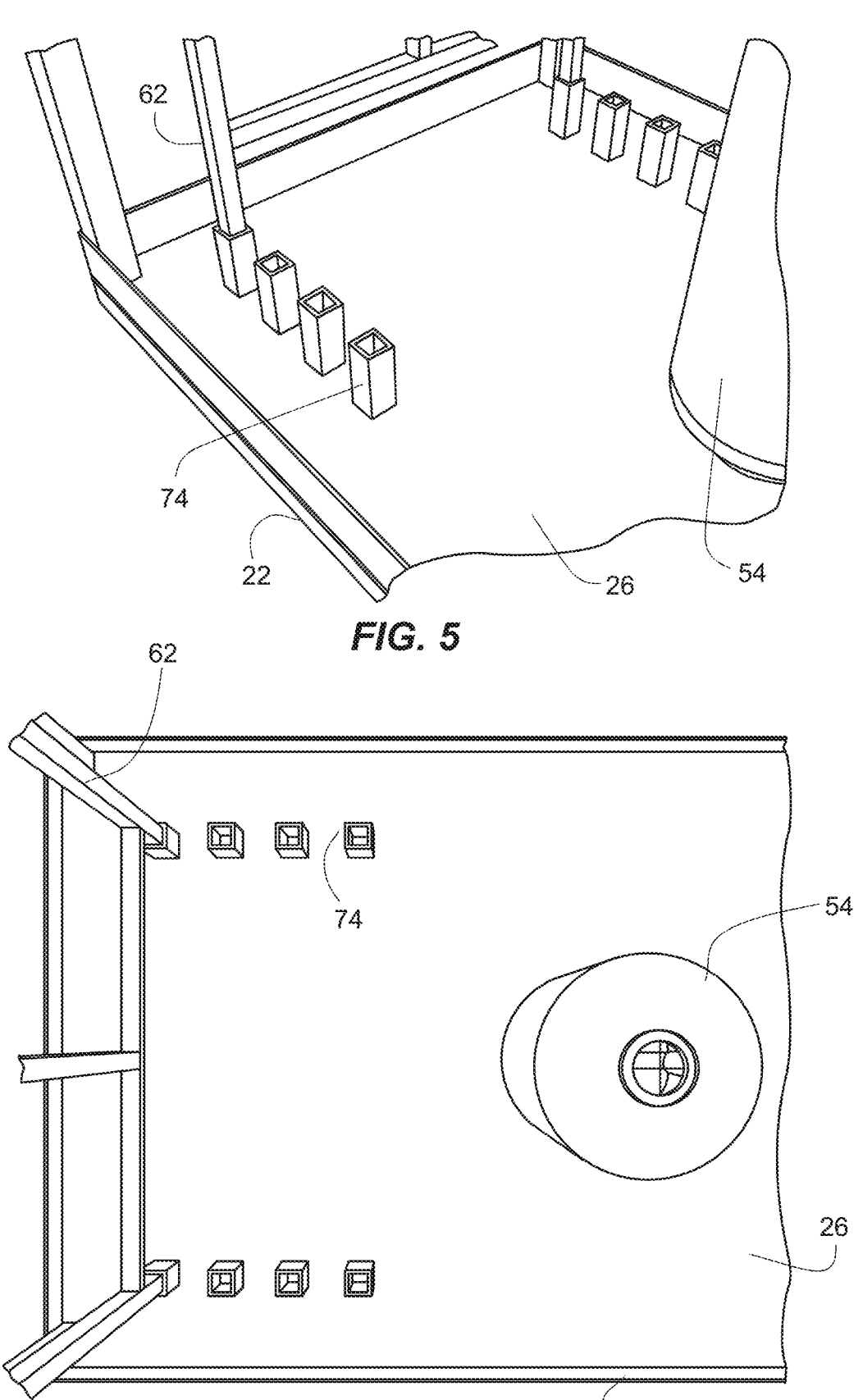
FIG. 5 is a partial internal perspective view of the FGR system of FIG. 1, showing a portion of an inside of the enclosure and the skid.
FIG. 6 is a partial internal top view of the FGR system of FIG. 1, showing a portion of the inside of the enclosure and the skid.
Figure 7:
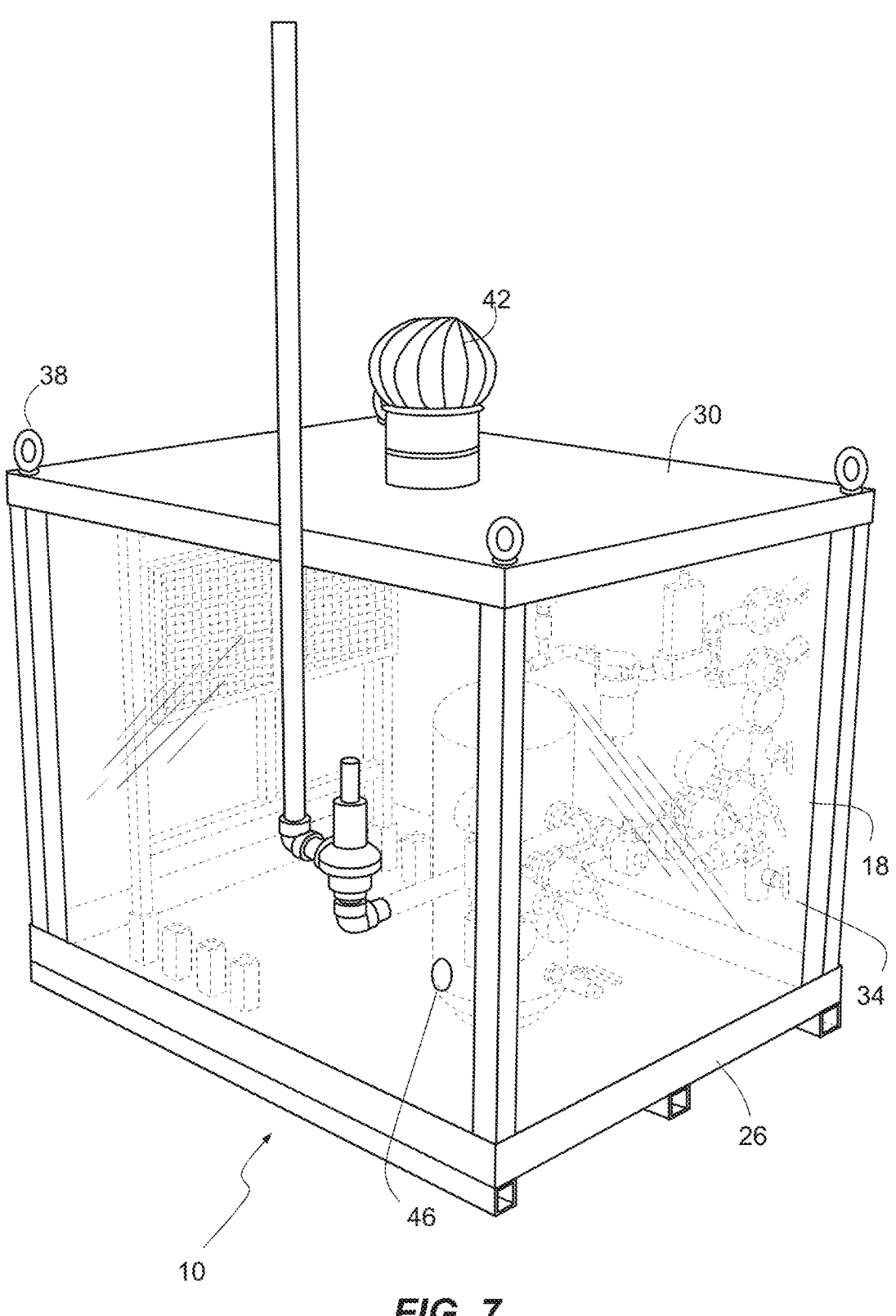
FIG. 7 is a perspective view of the FGR system of FIG. 1.
Figures 8, 9:
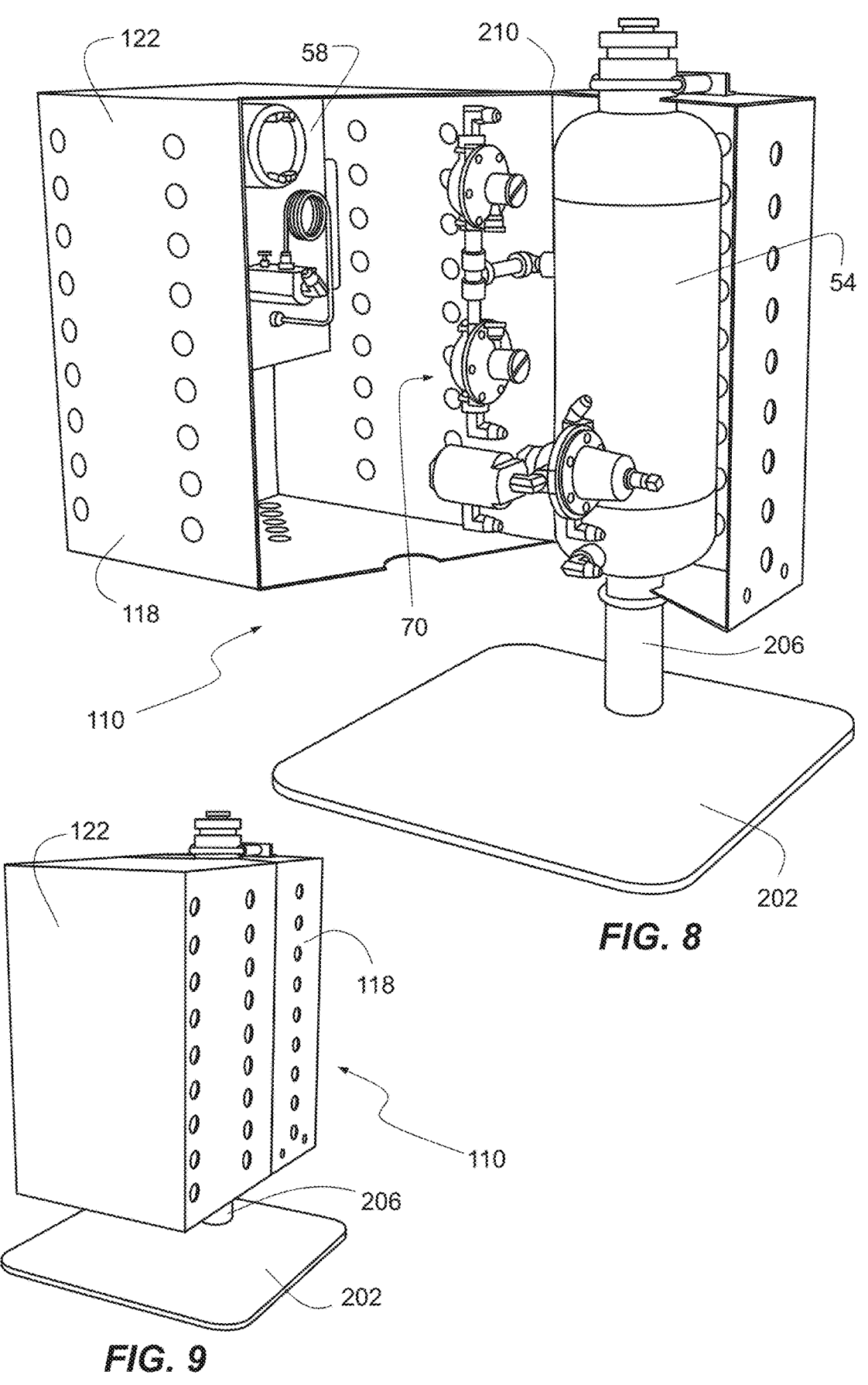
FIG. 8 is a perspective view of another FGR system in accordance with another embodiment, shown in an open configuration.
FIG. 9 is a perspective view of the FGR system of FIG. 8, shown in a closed configuration.
Figures 10, 11:
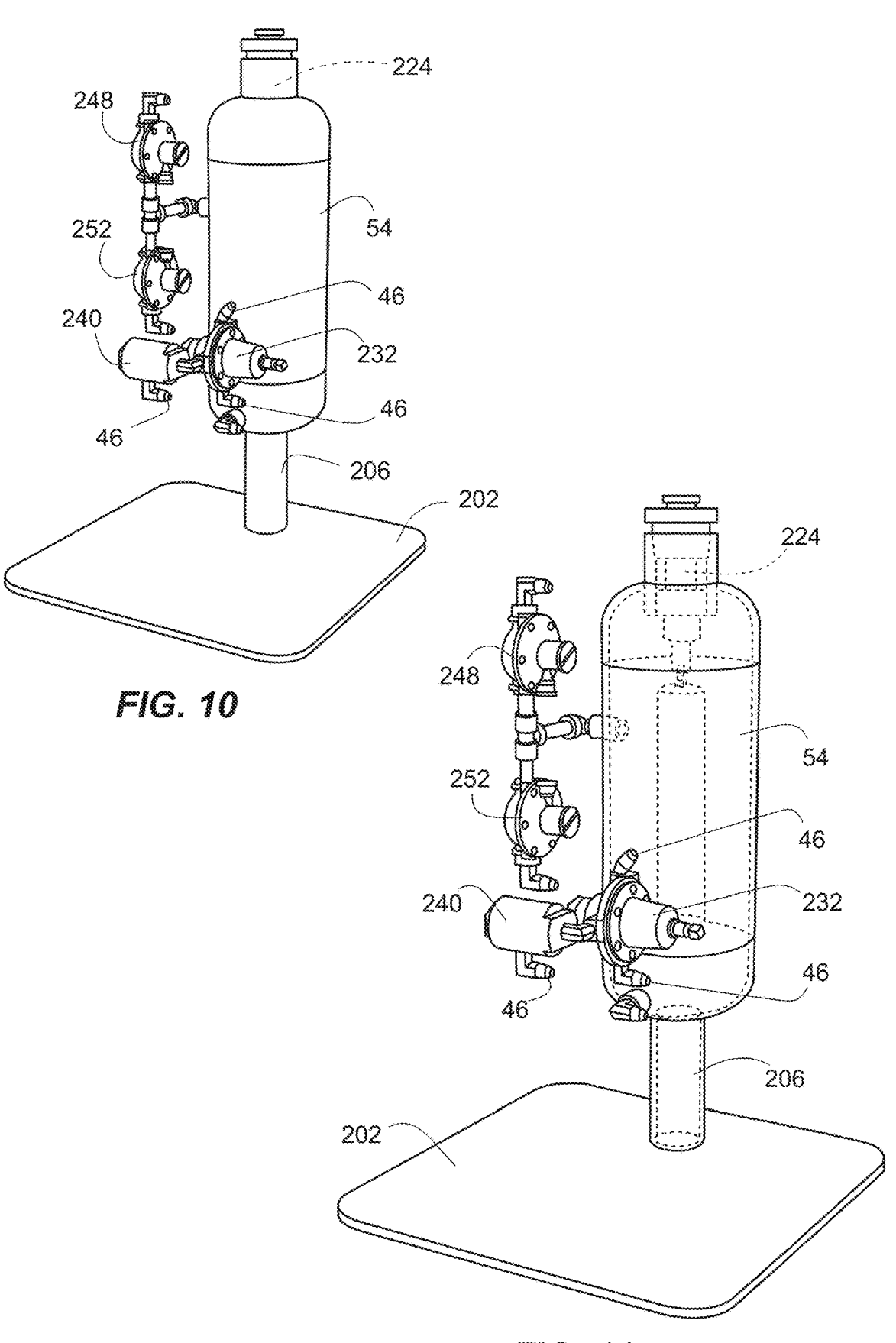
FIG. 10 is a partial perspective view of the FGR system of FIG. 8.
FIG. 11 is a partial perspective view of the FGR system of FIG. 8.

In one aspect, the FGR system 10 and the enclosure 18 can comprise a mobile skid 22 with a floor 26, a roof 30, and a perimeter wall 34 (FIG. 4). The floor 26 can be configured to be elevated and/or to have lower openings below the floor 26 to accommodate the forks of a forklift. In another aspect, the system 10, the enclosure 18 and the skid 22 can have eyelets 38 secured to a top thereof to allow the system 10, the enclosure 18 and the mobile skid 22 to be lifted with hooks, cables and a crane or loader. The system 10, the enclosure 18 and the skid 22 can be deliverable to a site with the fugitive gas source, such as adjacent the wellhead, and can be located on the ground. In one aspect, the skid 22 can be sized relatively small to fit in existing wellhead sites. For example, the skid 22 can have a footprint less than 4×8 ft. In addition, the roof 30 can have a vent 42 to vent the enclosure 18. The vent 42 and/or other vents, such as in the walls 34, can allow heat to escape and/or air (and oxygen) to enter.

The enclosure 18 and the skid 22 can have and carry an inlet 46 to be coupled to the fugitive gas source, such as a valve of the wellhead or a casing vent gas source. In one aspect, the enclosure 18 and the skid 22 can have and can carry a pilot gas inlet 50 to be coupled to a pilot gas source. The pilot gas inlet allows pilot gas into a pilot gas system to ensure constant operation in the event the Bradenhead pressure and/or flow falls too low to sustain a catalytic reaction. Thus, the FGR system 10 avoids release of Bradenhead to the atmosphere. The FGR system 10 can shift from pilot gas to Bradenhead gas automatically.

A scrubber or separator 54 is located in the enclosure 18 and the skid 22 and coupled to the inlet 46. The separator 54 receives the fugitive gas or casing vent gas, and removes any liquid. The scrubber or separator 54 can remove liquid from the casing vent gas. The liquid can be stored for subsequent removal. In one aspect, the separator 54 can be positioned towards one side of the enclosure 18 and the skid 22.

A catalytic heater 58 is located in the enclosure 18 and the skid 22. The catalytic heater 58 is coupled to the separator 54 to receive dry fugitive gas. The catalytic heater 58 reacts with the fugitive gas to burn the fugitive gas and produce heat in the enclosure 18 and the skid 22. The catalytic heater 58 can heat to over 300 degrees Fahrenheit to initiate a chemical reaction that destroys the vent gas. In one aspect, the catalytic heater 58 can be positioned at another opposite side of the enclosure 18 and the skid 22, opposite the separator 54. The catalytic heater 58 can be oriented to face the separator 54 so that heat from the catalytic heater 58 is directed towards the separator 54.

In one aspect, a panel 62 can be positioned in the enclosure 18 and the skid 22. The panel 62 can have multiple bays 66. Each bay 66 can receive a catalytic heater 58. Thus, the FGR system 10 can have at least one catalytic heater 58. The multiple bays 66 allows the FGR system 10 to be configured with a desired number of catalytic heaters 58 to match a size of the wellhead and/or an anticipated flow of fugitive gas. The number of catalytic heaters 58 can be varied in accordance with the requirement of the site, or the amount of vent gas. In one aspect, the panel 62 can have two bays 66. In another aspect, the panel 62 can have four bays 66. In one aspect, the catalytic heaters 58 can be selectively operated to match the flow of fugitive gas. Pressure regulators and valves can be coupled to the pipe system 70 between the separator 54 and the catalytic heaters 58.

The FGR system 10 also has a pipe system 70 interconnecting the catalytic heater 58, the separator 54, the inlet 46, and the pilot gas inlet 50. The pipe system 70 includes valves (e.g. needle valves, ball valves and solenoid valves), gauges (e.g. pressure and temperature gauges), sensors (e.g. pressure and temperature transducer) and regulators. The pipe system 70 is located in the enclosure 18 and the skid 22. In one aspect, a majority of the pipe system 70 can be positioned at one side of the enclosure 18 and the skid 22, along with the separator 54, opposite the catalytic heater 58. In one aspect, the majority of the pipe system 70 can be greater than half of the pipe system. In another aspect, the majority of the pipe system 70 can be a super majority.

The enclosure 18 and the skid 22 can carry, surround and enclose the separator 54, the catalytic heater 58, and the pipe system 70. Thus, the catalytic heater 58 heats the separator 54 and the pipe system 70. The inlet 46 and the pilot gas inlet 50 can be coupled to the separator 54 and the catalytic heater 58. In one aspect, both the pilot gas and the fugitive gas can be directed to and through the separator 54, with both pilot gas and fugitive gas directed from the separator 54 to the catalytic heater 58. Solenoid valves can be disposed in the pilot gas line and the fugitive gas line, between the inlet 46 and the pilot gas inlet 70 and the separator 54, to control flow.

In another aspect, the catalytic heater 58 and the panel 62 can be movably and selectively positioned with respect to the separator 54 and the pipe system 58. In one aspect, an array of sockets 74 can be carried by the floor 26 of the enclosure 18 and the skid 22. The array 74 can extend in a direction in varying proximity to the separator 54 and the pipe system 70. The panel 62 can have legs or posts that are selectively received is a set of the array of sockets 74 in a predetermined proximity to the separator 54 and the pipe system 70. Thus, the catalytic heater 58 can be selectively located in proximity with respect to the separator 54 and the pipe system 70. For example, the panel 62 and the catalytic heater 58 can be positioned closer to the separator 54 and the pipe system 70 in colder climates and seasons, and farther during in warmer climates and seasons.

The FGR system 10 and the skid 22 can have the enclosure 18 surrounding the skid 22 and carried by the skid 22 so that the separator 54, the catalytic heater 58, and the piping system 70 are enclosed in the skid 22. Thus, the heat from the catalytic heater 58 can be maintained in the skid 22 and the enclosure 18 to avoid freeze-up of the pipe system

70 and the separator 54 in colder climates and seasons. The enclosure 18 and the skid 22 can have a vent 42, such as a roof vent, carried by the enclosure 18 to allow air into the enclosure 18 and the skid 22 for combustion by the catalytic heater 58.

The FGR system 10 and the skid 22 can also have a control system coupled to some of the valves, gauges and sensors and selectively controlling the valves to allow vent gas, and/or pilot gas, into the separator 54, and from the separator 54 to the catalytic heater 58.

A method for eliminating casing vent gas from a wellhead, and for using the FGR system 10 as described above, can comprise:

1) positioning the enclosure 18 and the skid 22 adjacent to the wellhead;

2) connecting the enclosure 18 and the skid 22 to a valve atop the wellhead to receive the casing vent gas from the wellhead and transport the casing vent gas into the enclosure 18 and the skid 22;

4) removing liquids from the casing vent gas with the separator 54 disposed in the skid 22; and 5) reacting with the casing vent gas in the catalytic heater 58 and heating the enclosure 18 and the skid 22 with heat from the reaction of the casing vent gas.

In addition, supplemental pilot gas can be provided to the catalytic heater 58 as needed. Furthermore, the catalytic heater 58 can be selectively positioned in proximity to the separator 54 and the pipe system 70.

Referring to FIGS. 8-11, another FGR system 110 in accordance with another embodiment is shown, and which is similar in many respects to that described above, and which description is incorporated herein by reference. The following description can apply to the preceding description as well. The enclosure 118 can be elevated above the ground by a plinth 202 and a column 206. The plinth 202 can be positioned over a support surface, such as the ground adjacent a wellhead. The plinth 202 can have a size at least as great as a lateral size of the enclosure 118 to resist tipping. The column 206 can be carried by the plinth 202. The enclosure 118 is carried by the column 206 and elevated over the plinth 202. A lower end of the column 206 can be attached to the plinth 202, while an upper end of the column 206 can be coupled to a bottom of the separator 54.

The enclosure 118 can have a matrix of apertures therein, but still be a substantial enclosure. In one aspect, the enclosure 118 can comprise or can be a clamshell 122 with a pair of portions or shells movably coupled together. In another aspect, the portions or shells can be pivotally coupled together by a hinge 210 and pivotal with respect to one another. One stationary portion or shell can be stationary and secured to the column 206, while the other movable portion or shell can be movable and can pivot with respect to the stationary portion. In addition, the stationary portion or shell can carry and substantially contain the separator 54 and the pipe system 70, while the movable portion or shell can carry and substantially contain the catalytic heater 58. Thus, the catalytic heater 58 can move and pivot with the movable portion or shell with respect to the separator 54 and the pipe system 70.

In one aspect, the separator 54 can be mounted on the column 206, and can form a portion of the column. A bottom of the stationary portion or shell can be coupled to the column 206 under the separator 54, while a top of the stationary portion or shell can be coupled to a top of the separator 54.

As described above, the separator 54 can separate fluid from the gas, and can contain the removed fluid for later disposal. The separator 54 can have a high fluid shutdown 224 to sense a volume of the separator and stop the flow of gas and shutdown down the operation of the FGR system 110 in the event that the fluid volume exceeds a safe level. The shutdown 224 can comprise a mechanical float located near a top of the separator 54.

The FGR system 110 and the pipe system 70 can comprise a Bradenhead high-pressure regulator 232 coupled to the inlet 46 to receive Bradenhead gas from the fugitive gas source. The high-pressure regulator 232 can have a working pressure of 5,000 psi, and can manage Bradenhead supply and operating pressure of the FGR system 110. In addition, a high-pressure in-line filter 240 can be coupled to the high-pressure regulator 232. Supply lines, also rated at 5,000 psi, can be coupled to the high-pressure in-line filter 240 and the high-pressure regulator 232.

The FGR system 110 and the pipe system 70 can comprise a low-pressure Bradenhead regulator 248 and a low-pressure pilot gas regulator 252. The low-pressure Bradenhead regulator 248 manages Bradenhead supply pressure and flow to the catalytic heater 58. The low-pressure pilot gas regulator 252 manages pilot gas supply pressure and flow to the catalytic heater 58, and ensures continuous operation of the catalytic heater 58 in the event that Bradenhead gas is insufficient.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A fugitive gas remediation (FGR) system for eliminating fugitive gas, the system comprising:
   a) an enclosure configured to be positionable at a site with a fugitive gas source;
   b) the enclosure comprising a floor, a roof and a perimeter wall;
   c) an inlet carried by the enclosure and configured to be coupled to the fugitive gas source;
   d) a separator located in the enclosure, and surrounded and enclosed by the enclosure, and coupled to the inlet and configured to remove liquid from the fugitive gas;
   e) a catalytic heater located in the enclosure and coupled to the separator;

f) the catalytic heater being configured to receive the fugitive gas to enable the fugitive gas to be reacted in the catalytic heater in a catalytic reaction;
   g) a pilot gas inlet carried by the enclosure and configured to be coupled to a pilot gas source;
   h) the catalytic heater being coupled to the pilot gas inlet to receive pilot gas to enable continuous operation of the catalytic heater when the fugitive gas has an insufficient pressure; and
   i) the pilot gas inlet and the inlet being combined together to enable the FGR system to automatically shift between pilot gas and fugitive gas at the catalytic heater.

2. The FGR system of claim 1, further comprising:
   a T-connection located in the enclosure and coupling the pilot gas inlet and the inlet.

3. The FGR system of claim 1, further comprising:
   a fugitive gas pressure regulator located in the enclosure and coupled to the inlet, and configured to manage fugitive gas pressure;
   a pilot gas pressure regulator located in the enclosure and coupled to the pilot gas inlet, and configured to manage pilot gas pressure; and
   the pilot gas pressure regulator enabling the continuous operation of the catalytic heater when the fugitive gas has an insufficient pressure or flow.

4. The FGR system of claim 1, further comprising:
   the catalytic heater being configured to produce heat in the enclosure.

5. The FGR system of claim 1, further comprising:
   a pipe system located in the enclosure, and comprising valves, gauges and regulators, and interconnecting the catalytic heater, the separator, the inlet and the pilot gas inlet;
   the separator and a majority of the pipe system being positioned at one side of the enclosure; and
   the catalytic heater being positioned at another side of the enclosure opposite the separator and the majority of the pipe system.

6. The FGR system of claim 1, further comprising:
   the enclosure having a footprint less than 4×8 feet and being deliverable to the site with the fugitive gas and locatable on the ground; and
   eyelets secured to a top of the enclosure to enable the enclosure to be lifted.

7. The FGR system of claim 1, further comprising:
   the enclosure comprising a mobile skid;
   the mobile skid configured to be deliverable to the site with the fugitive gas source; and
   the mobile skid carrying the separator and the catalytic heater.

8. The FGR system of claim 1, further comprising:
   the enclosure comprising a clamshell with portions movably coupled with respect to one another; and
   the catalytic heater carried by one portion of the clamshell and movable with the one portion of the clamshell with respect to another portion of the clamshell.

9. A fugitive gas remediation (FGR) system for eliminating fugitive gas, the system comprising:
   a) an enclosure configured to be positionable at a site with a fugitive gas source;
   b) the enclosure comprising a floor, a roof and a perimeter wall;
   c) an inlet carried by the enclosure and configured to be coupled to the fugitive gas source;

d) a separator located in the enclosure, and surrounded and enclosed by the enclosure, and coupled to the inlet and configured to remove liquid from the fugitive gas;

e) a pipe system located in the enclosure, and surrounded and enclosed by the enclosure, and comprising valves, gauges and regulators, and coupled to the separator;

f) a catalytic heater located in the enclosure and coupled to the separator, the catalytic heater being configured to receive the fugitive gas to enable the fugitive gas to be reacted in the catalytic heater in a catalytic reaction;

g) the separator and a majority of the pipe system being positioned at one side of the enclosure;

h) the catalytic heater being positioned at another side of the enclosure opposite the separator and the majority of the pipe system;

i) a pilot gas inlet carried by the enclosure and configured to be coupled to a pilot gas source; and j) a T-connection located in the enclosure and coupling the pilot gas inlet and the inlet.

10. The FGR system of claim 9, further comprising:

the catalytic heater being coupled to the pilot gas inlet to receive pilot gas to enable continuous operation of the catalytic heater when the fugitive gas has an insufficient pressure; and the pilot gas inlet and the inlet being combined together to enable the FGR system to automatically shift between pilot gas and fugitive gas at the catalytic heater.

11. The FGR system of claim 9, further comprising:

a fugitive gas pressure regulator located in the enclosure and coupled to the inlet, and configured to manage fugitive gas pressure;

a pilot gas pressure regulator located in the enclosure and coupled to the pilot gas inlet, and configured to manage pilot gas pressure; and the pilot gas pressure regulator enabling continuous operation of the catalytic heater when the fugitive gas has an insufficient pressure or flow.

12. The FGR system of claim 9, further comprising:

the catalytic heater being configured to produce heat in the enclosure.

13. The FGR system of claim 9, further comprising:

the enclosure having a footprint less than 4×8 feet and being deliverable to the site with the fugitive gas and locatable on the ground; and eyelets secured to a top of the enclosure to enable the enclosure to be lifted.

14. A fugitive gas remediation (FGR) system for eliminating fugitive gas, the system comprising:

a) an enclosure being deliverable to a site with a fugitive gas source and locatable on the ground;

b) the enclosure comprising a floor, a roof and a perimeter wall;

c) an inlet carried by the enclosure and configured to be coupled to the fugitive gas source;

d) a separator located in the enclosure, and surrounded and enclosed by the enclosure, and coupled to the inlet and configured to remove liquid from the fugitive gas;

e) a catalytic heater located in the enclosure and coupled to the separator, the catalytic heater being configured to receive the fugitive gas to enable the fugitive gas to be reacted in the catalytic heater in a catalytic reaction;

f) the catalytic heater being configured to produce heat in the enclosure;

g) a pilot gas inlet carried by the enclosure and configured to be coupled to a pilot gas source;

h) a fugitive gas pressure regulator located in the enclosure and coupled to the inlet, and configured to manage fugitive gas pressure;

i) a pilot gas pressure regulator located in the enclosure and coupled to the pilot gas inlet, and configured to manage pilot gas pressure; and j) the pilot gas pressure regulator enabling continuous operation of the catalytic heater when the fugitive gas has an insufficient pressure or flow.

15. The FGR system of claim 14, further comprising:

the catalytic heater being coupled to the pilot gas inlet to receive pilot gas to enable continuous operation of the catalytic heater when the fugitive gas has an insufficient pressure; and the pilot gas inlet and the inlet being combined together to enable the FGR system to automatically shift between pilot gas and fugitive gas at the catalytic heater.

16. The FGR system of claim 14, further comprising:

a T-connection located in the enclosure and coupling the pilot gas inlet and the inlet.

17. The FGR system of claim 14, further comprising:

a pipe system located in the enclosure, and comprising valves, gauges and regulators, and interconnecting the catalytic heater, the separator, the inlet and the pilot gas inlet;

the separator and a majority of the pipe system being positioned at one side of the enclosure; and the catalytic heater being positioned at another side of the enclosure opposite the separator and the majority of the pipe system.

* * * * *